Aug. 4, 1970 H. VOGT 3,522,513

RECTIFYING APPARATUS

Filed Nov. 4, 1968 2 Sheets-Sheet 1

Aug. 4, 1970 H. VOGT 3,522,513

RECTIFYING APPARATUS

Filed Nov. 4, 1968 2 Sheets-Sheet 2

United States Patent Office 3,522,513
Patented Aug. 4, 1970

3,522,513

RECTIFYING APPARATUS

Herbert Vogt, Munich, Germany, assignor to Siemens Aktiengesellschaft, Berlin and Munich, Germany, a corporation of Germany Filed Nov. 4, 1968, Ser. No. 773,085
Claims priority, application Germany, Jan. 12, 1968, 1,639,388; Aug. 7, 1968, 1,764,795
Int. Cl. H02m *7/100;* H02k *9/00*
U.S. Cl. 321—8 13 Claims

ABSTRACT OF THE DISCLOSURE

A rectifier apparatus has a bus frame for interconnecting a plurality of adjacent semiconductor components. Steel spring members are secured between two legs of the frame to hold the components in place under pressure in respective seats provided in the frame thereby establishing a connection between the components and the frame which is both heat conductive and electrically conductive. An insulator separates the component from the spring member and connecting member is seated in the insulator. The spring member is in pressure contact with the insulator and applies a force thereto which places a pressure surface of the connecting member in pressure contact with the component.

My invention relates to a rectifying apparatus of the type comprising a bus structure to which at least two semiconductor components are fastened, one beside the other, the connection being between one pole of each semiconductor component and the bus and having a good heat conductivity.

In rectifier apparatus of this type, as heretofore known, the connection between the semiconductor components and the bus structure is by welding, soldering or other material integrating means or is such that it cannot readily be loosened. For example, the housing of each semiconductor component may be directly soldered to the bus bar. In other cases the housing of the semiconductor component is cup shaped and provided with a protruding edge, the component being press-fitted into a mating recess of the bus bar.

It is an object of my invention, relating to rectifying apparatus generally of the above-mentioned type, to provide apparatus in which a good current and heat conducting connection between the semiconductor components and the bus structure is provided by means that permit the connection to be loosened at any time without the destruction of any parts.

Preferably employed for the purpose of the invention are known disc-type rectifier cells that contain a semiconductor member whose semiconductor body, for example of silicon, contains at least one p-n junction and is mounted in a housing between two mutually insulated cover plates which are pressed against the semiconductor member without any fusion or merger of materials. For improving the contact between the semiconductor body and the external circuit, such disc-type cells are kept under stress between pressure pieces, if necessary, with the interposition of ductile intermediate layers. It is a further object of my invention, therefore, to provide a reliable yet readily loosenable connection between such disc-type rectifier cells and the appertaining bus structure of multi-cell rectifying apparatus.

To this end, and in accordance with a feature of my invention, the seating locality of each semiconductor component is positioned between two legs which protrude in the same direction from a bus structure on opposite sides thereof. At a given distance above the seating locality there is provided a spring piece which is supported or braced at the two legs. Between the seating locality and the spring piece there is located a disc-type rectifier cell in series relation to an insulating piece and the pressure piece or portion of a connection member, so that the disc cell is kept under compressing stress having one of its contact faces abutting against the seating locality and the other contact face resting against a pressure portion of the connector member.

According to another, more specific feature of the invention, I employ a connector member which is located between the legs of the bus structure and the spring member. Preferably, the connector member is equipped, in the vicinity of its pressure portion and on one side of the connector, with lateral guides for respective disc cells and, on the other side, with lateral guides for respective insulating pieces. The spring member in such embodiments need not be equipped with the particular guide for the insulating piece, provided the disc cell is laterally guided by the seating locality, for example by a planar recess in the bus bar structure. This guidance is preferably effected with the aid of an insulating auxiliary body which is seated or pressed upon the connector member. In such an embodiment, the insulating piece has at least one convex surface so as to function as a universal joint or the like.

Applicable as an insulating piece in embodiments of the type described above is also an insulating coating on the spring member.

The tensioning or pre-stressing of the disc cells is preferably so designed that the entire contact surfaces of the semiconductor body are uniformly subjected to pressure. For this purpose the contact faces of the disc cell are made planar and the engaging face of the pressure portion is made convex, or conversely the latter face of the pressure portion is made planar and one of the contact faces of the disc cell is made convex. In both cases, care should be taken that the cover plate of the disc cell which cooperates with the pressure portion possesses a sufficient stiffness and hardness because only then is a uniform pressure loading of the semiconductor secured.

For protecting the contact faces, a ring-shaped jacket of elastic insulating material may be placed additionally about the disc cell. The dimensions of such an insulating jacket are to be so chosen that it rests under slight pressure between the bus structure and the spring member or the flange of the correspondingly designed insulating piece.

Additional protection of the contact faces can be obtained by applying a contact grease known for such purposes.

To prevent inadvertent loosening of the spring member, the legs of the bus bar structure and/or the ends of the spring member are provided with catch means, so that the spring member can be taken from the catch-secured normal position only by subjecting the spring member to additional flexing. The catch seat is adapted to the shape and spring force of the spring member and the other parts of the rectifier apparatus so as to obtain an area pressure of at least 1 kp. per $mm.^2$ at the contact faces.

The invention will be further described with reference to embodiments of rectifying apparatus according to the invention illustrated by way of example on the accompanying drawings in which.

Figures 1, 4:
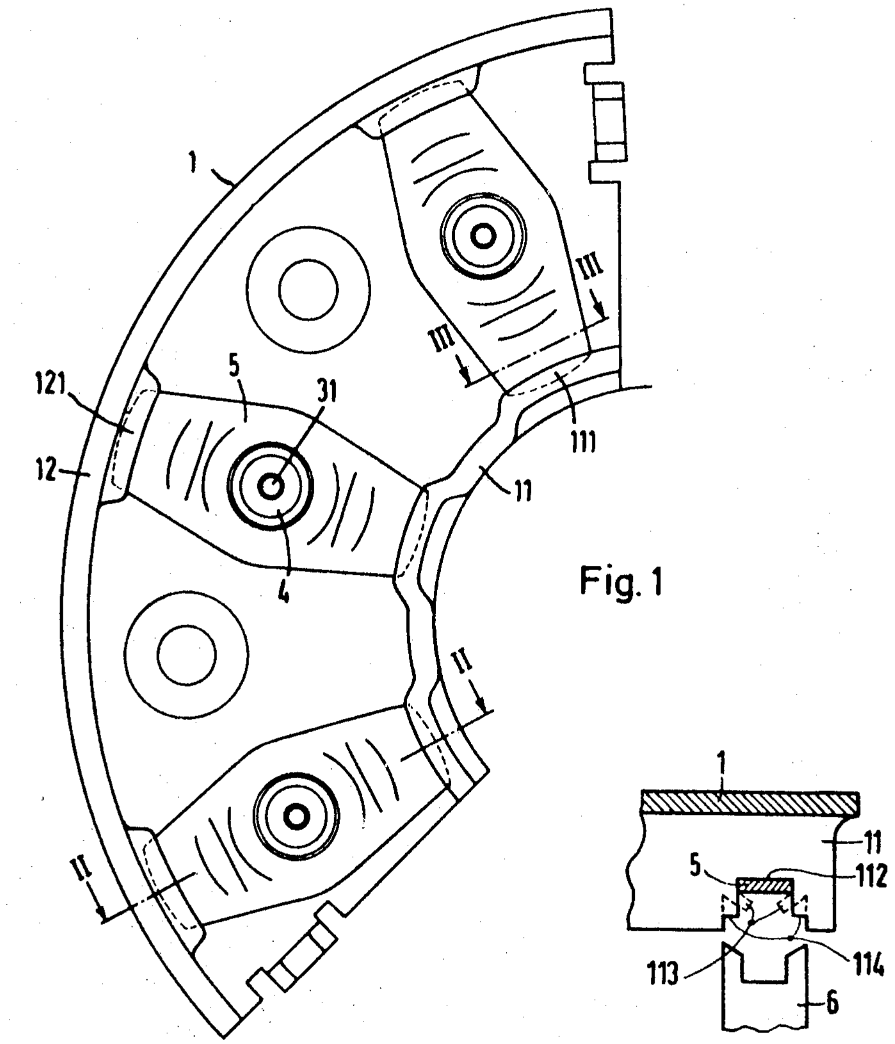
FIG. 1 is a plan view of the rectifier apparatus equipper with three disc cells.
FIG. 4 illustrates another embodiment by a cross section which substantially corresponds to that shown in FIG. 3.
Figure 2:
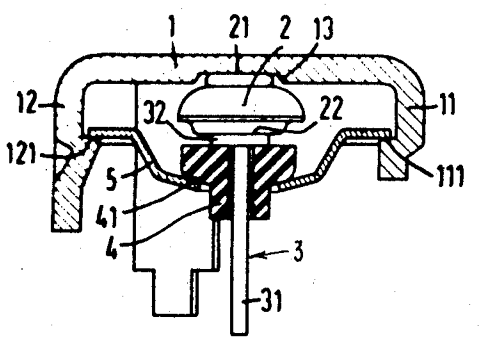
FIG. 2 is a cross section through the apparatus of FIG. 1 along the line II–II.

The illustrated apparatus comprises a bus bar structure 1 consisting for example of aluminum. This structure is provided on opposite sides with respective legs 11 and 12 which protrude from the bus structure in the same direction and are at right angles to the main body of the bus structure. At the locality of the legs 11 and 12, the bus structure has generally a U-shaped cross section. In the illustrated embodiment the bus 1 has the shape of a circular ring sector and is produced for example by deep drawing of sheet material.

Pressed into the legs 11 and 12 are shoulders 111 and 121 respectively. They serve as abutments for the ends of a spring member 5. The spring member 5, made for example of spring steel, has a circular opening in its middle. An insulating piece 4 protrudes through the center opening toward the bus structure and has a broadening shape between the spring member and the bus. The insulator 4 is rotationally symmetrical and has a spherical shoulder 41 descending from the spring toward the bus. To afford the universal-joint motion of the insulator 4 in the opening of the spring member 5, the spring member 5 is given a convex shape at its central locality resting against the shoulder portion of the insulator. The curvatures in the contacting vicinity between shoulder and spring member have approximately the same radii.

The insulator 4 has a central bore traversed by a shaft 31 which forms part of a connector member 3 and is provided with a pressure piece 32. The disc cell has its contact faces 21 and 22 planted between a seating locality 13 in the bus structure 1 and the pressure portion 32 of the connector 3. Pressing the seating locality 13 into the bus also effects an orientation with respect to the proper position of the disc cell and also takes care of obtaining a planar contact engagement at the bus structure.

Figure 3:
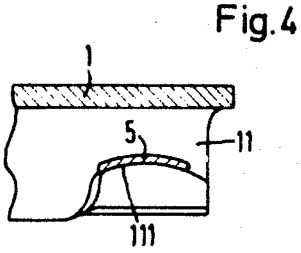
FIG. 3 is a cross section through part of the apparatus according to FIG. 1, the section being along the line III–III.

For clamping the disc cell the spring member 5 is first stuck onto the shaft 31 and the insulator 4 in a position angularly displaced from that shown in FIG. 1 to such an extent that the ends of the spring member can be forced beneath the shoulders 111 and 121, whereafter these ends are placed in proper position beneath these shoulders by turning the spring member 5. For securing the spring member in this position, the engaging surfaces of the shoulders 111 and 121 are convex and the ends of the pressure spring 5 are complementarily concave (FIG. 3).

The materials of each two mutually engaging contact faces are preferably as close as possible to each other in the electrical voltage series. Zinc plated, nickel coated or silvered surfaces have been found more suitable for this purpose.

The illustrated embodiment described above is particularly well applicable for mounting it to the bearing shield of a three-phase generator for producing current in lighting systems. In this case the disc cells 2 are preferably so inserted that either their anodes or their cathodes are in contact with the bus structure. Thus, the apparatus shown in FIG. 1 constitutes one-half of a three-phase bridge network in which the bus structure constitutes either the plus or the minus pole and the respective shafts 31 or the pressure pieces 32 constitute the alternating-current terminals. With the aid of two such devices according to FIG. 1 (in which merely the disc cells are attached to the two bus structures with respectively different polarities) there is obtained with simple means a complete three-phase bridge network. The two semi-bridges mounted beside each other upon the bearing shield are simply provided with an insulating plate which has socket openings for the totality of six shafts 31, these sockets being interconnected by printed, punched or ordinary wire connections.

In the embodiments so far described, the abutment shoulders and the spring members are so designed that the spring members will catch into a seating locality after being subjected to a rotational movement.

A different modification resulting in the simplified production with respect to the mounting of the spring members in the legs 11 and 12 is illustrated in FIG. 4. This illustration represents a cross section otherwise corresponding to the one shown in FIG. 3. The spring member 5 is inserted into a U-shaped recess 112. The dimensions given to the recess, to the disc cell, the connector and the insulator are so chosen that the relative position of the parts shown in FIG. 4 can be obtained only when applying external pressure upon the spring member 5. Furthermore, the dimensions as well as the spring constant of the spring member are so chosen that when the position according to FIG. 4 is occupied, the desired contact pressure will obtain.

As soon as the ends of the spring member 5 are brought by external pressure into the position shown in FIG. 4, the part denoted by 114 is cut and placed into the broken-line position 113 at both sides of the U-shaped recess, this being done with the aid of a tool 6. According to FIG. 4, all of the spring members 5 illustrated in FIG. 1 can be interconnected on both sides with the respective legs 11 and 12. For exchanging the disc cells the spring members 5 can be lifted a few tenths of one millimeter with the aid of a plier-type tool.

Figure 5:
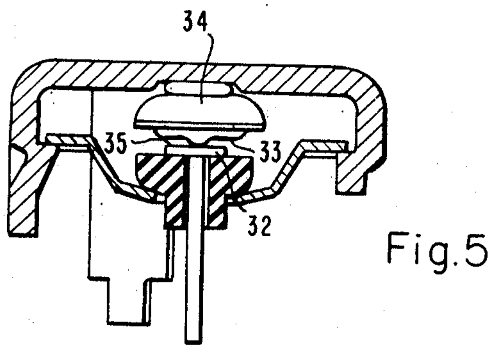
FIG. 5 is a rectifying apparatus of my invention, partially in section, in which one contact face of the disc cell is provided with a convex surface.

So that the contact surfaces of the semiconductor body are uniformly subjected to pressure, one of the contact faces 33 of disc cell 34 is made convex and the engaging face 35 of pressure piece 32 is made planar (FIG. 5). Conversely, if required, the contact faces of the disc cell are made planar and the engaging face of the pressure piece is made convex (not shown).

Figure 6:
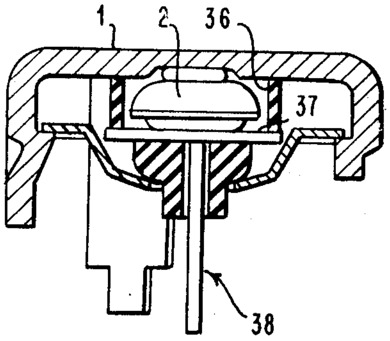
FIG. 6 is a rectifying apparatus of my invention, partially in section, in which a ring-shaped jacket is provided to protect the contact faces of the disc cell.
Figure 7:
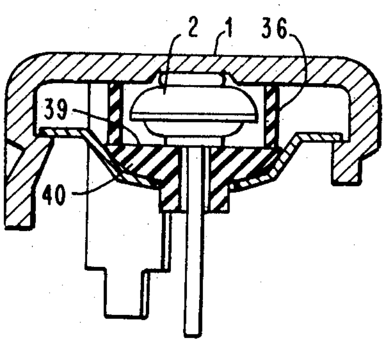
FIG. 7 is another embodiment of that shown in FIG. 6.

The contact faces of the disc cell 2 are protected by placing a ring-shaped jacket 36 of elastic insulating material about the latter (FIG. 6). In this embodiment, the jacket 36 is dimensioned so that it rests under slight pressure between bus structure 1 and the pressure piece 37 of connected 38. Alternately, the jacket 36 is disposed intermediate the bus structure 1 and the end face 39 of insulator 40 (FIG. 7).

To those skilled in the art it will be obvious upon a study of this disclosure that my invention permits of a great variety of modifications and hence may be given embodiments other than those illustrated and described herein, without departing from the essential features of my invention and within the scope of the claims annexed hereto.

I claim:

1. A rectifier apparatus, comprising a bus frame for interconnecting a plurality of mutually adjacent semiconductor components, said frame having two mutually adjacent legs, seat means formed in said frame between said legs each corresponding to a specific one of said components, spring means disposed between said legs above said respective seat means in a manner whereby respective gaps are formed between corresponding ones of said spring means and said seat means, said components being situated in said respective gaps and each having two contact surfaces, insulators situated in said respective gaps adjacent corresponding ones of said spring means, and connecting members each having a pressure surface and being seated on said respective insulators, each of said spring means being in pressure contact with a corresponding one of said insulators and applying a force thereto in a direction whereby one of said contact surfaces is in connection with said pressure surface and the other of said contact surfaces is in connection with said seat means, the latter connection being both heat conductive and electrically conductive.

2. A rectifier apparatus according to claim 1, said connecting members each comprising a first guide means for positioning a corresponding one of said components, and a second guide means for positioning a corresponding one of said insulators.

3. In a rectifier apparatus according to claim 2, said insulators each being seated on a corresponding one of said connecting members and being adapted to guide the same with respect to a corresponding one of said spring means.

4. In a rectifier apparatus according to claim 1, said spring means having respective openings located opposite corresponding ones of said seat means, said insulators having respective openings and being disposed in said respective openings of said spring means, and each of said connecting members comprising a shaft having a T-shaped extension formed at one of its ends for carrying said pressure surface, the other end of said shaft penetrating said openings of a corresponding one of said insulators.

5. In a rectifier apparatus according to claim 1, each of said insulators having at least one convex face.

6. In a rectifier apparatus according to claim 1, one of said pressure and adjacent contact surfaces being planar and convex respectively.

7. In a rectifier apparatus according to claim 4, each of said insulators having a spherical shoulder extending from the elevation of said opening of said spring means toward said component, and said spring means having a convex portion in surrounding relation to said spherical shoulder.

8. In a rectifier apparatus according to claim 7, said insulator engaging said spring member at a location where the radius of curvature of said spherical shoulder is substantially the same as that of said convex portion.

9. In a rectifier apparatus according to claim 1, each of said legs of said bus frame being provided with catch means for holding said spring means.

10. In a rectifier apparatus according to claim 1, said spring means having respective end portions, each of said end portions being provided with respective catch means for holding said spring means in said bus frame.

11. In a rectifier apparatus according to claim 9, each of said catch means being an abutment shoulder having a curved surface, said spring means having respective end portions each having a curved surface for engaging a corresponding one of said abutment shoulder curved surfaces, one of said engaging surfaces being concave and the other of said engaging surfaces being convex.

12. A rectifier apparatus according to claim 1, said components each having a ring-shaped jacket of insulating material, said jacket having respective end surfaces, one of said end surfaces being in pressure contact with said bus frame and the other of said end surfaces being in pressure contact with said pressure surface of said connecting member.

13. In a rectifier apparatus according to claim 12, said insulator having an end face, the other of said end surfaces of said jacket being in pressure contact with said end face.

References Cited

UNITED STATES PATENTS

| | | | |
|---|---|---|---|
| 3,160,771 | 12/1964 | Martin et al. | 321—8 XR |
| 3,173,038 | 3/1965 | Brown | 321—8 XR |
| 3,275,921 | 9/1966 | Fellendorf et al. | 321—8 |
| 3,295,046 | 12/1966 | Margaira | 321—8 |
| 3,371,235 | 2/1968 | Hoover | 321—8 XR |

OTHER REFERENCES

German printed application 1,130,058, May 24, 1962.

WILLIAM M. SHOOP, JR., Primary Examiner

U.S. Cl. X.R.

310—63